US006820339B2

(12) United States Patent
Albrightson

(10) Patent No.: US 6,820,339 B2
(45) Date of Patent: Nov. 23, 2004

(54) RIGHT-ANGLE ACCESSORY SAW FOR USE WITH ELECTRIC DRILL

(76) Inventor: Todd A. Albrightson, P.O. Box 993722, Redding, CA (US) 96099

( * ) Notice: Subject to any disclaimer, the term of this patent is extended or adjusted under 35 U.S.C. 154(b) by 65 days.

(21) Appl. No.: 10/263,248

(22) Filed: Oct. 1, 2002

(65) Prior Publication Data
US 2004/0060179 A1 Apr. 1, 2004

(51) Int. Cl.[7] .............................. B27B 3/12; B27B 3/26
(52) U.S. Cl. .............................. 30/392; 30/122; 30/500
(58) Field of Search .......................... 30/392–394, 122, 30/500, 337, 338, 272, 166, 220, 123.3, 182, 187; 279/102, 79, 907, 24, 28, 29, 87; 83/699.21

(56) References Cited

U.S. PATENT DOCUMENTS

| | | | | |
|---|---|---|---|---|
| 2,211,741 A | * | 8/1940 | Elwell | 74/56 |
| 2,713,271 A | * | 7/1955 | Dodegge | 74/50 |
| 2,746,493 A | * | 5/1956 | Babcock | 30/394 |
| 3,236,111 A | * | 2/1966 | Naslund | 74/50 |
| 3,388,728 A | * | 6/1968 | Riley, Jr. et al. | 30/392 |
| 3,528,463 A | * | 9/1970 | Mejia | 30/392 |
| 3,832,772 A | * | 9/1974 | Sumida | 30/392 |
| 4,304,047 A | * | 12/1981 | Jesionowski | 30/277 |
| 4,304,147 A | * | 12/1981 | Linnemeier et al. | 74/492 |
| 4,385,443 A | * | 5/1983 | O'Banion | 30/393 |
| 5,218,767 A | * | 6/1993 | Wells | 30/277.4 |
| 5,566,768 A | * | 10/1996 | Bourke | 173/29 |
| 5,582,041 A | * | 12/1996 | Spiess | 69/37 |
| 5,607,265 A | * | 3/1997 | Lane | 408/20 |
| 5,755,293 A | * | 5/1998 | Bourke | 173/29 |
| 5,810,367 A | * | 9/1998 | Holzer et al. | 279/102 |
| 6,352,127 B1 | * | 3/2002 | Yorde | 173/216 |
| 6,619,159 B2 | * | 9/2003 | Galat | 81/57.13 |
| 6,651,348 B1 | * | 11/2003 | Steinmann | 30/392 |

* cited by examiner

Primary Examiner—Allan N. Shoap
Assistant Examiner—Ghassem Alie
(74) Attorney, Agent, or Firm—R. Michael West

(57) ABSTRACT

A right-angle accessory saw for use with an electric drill comprises a drive shaft housing and a saw head. A drive shaft is mounted for rotation within the drive shaft housing. The drive shaft has a drill connection end extending outwardly from a proximate end of the drive shaft housing. The other end of the drive shaft extends through the housing to a cam, located with a distal end of the drive shaft housing. The saw head extends transversely from the distal end of the drive shaft housing. A push rod is mounted for reciprocating translation within the saw head. The push rod includes a cam follower on an inner end and a saw blade holder on an outer end. The push rod is spring-biased inwardly toward the cam. A saw blade is detachably mounted within the saw blade holder.

20 Claims, 4 Drawing Sheets

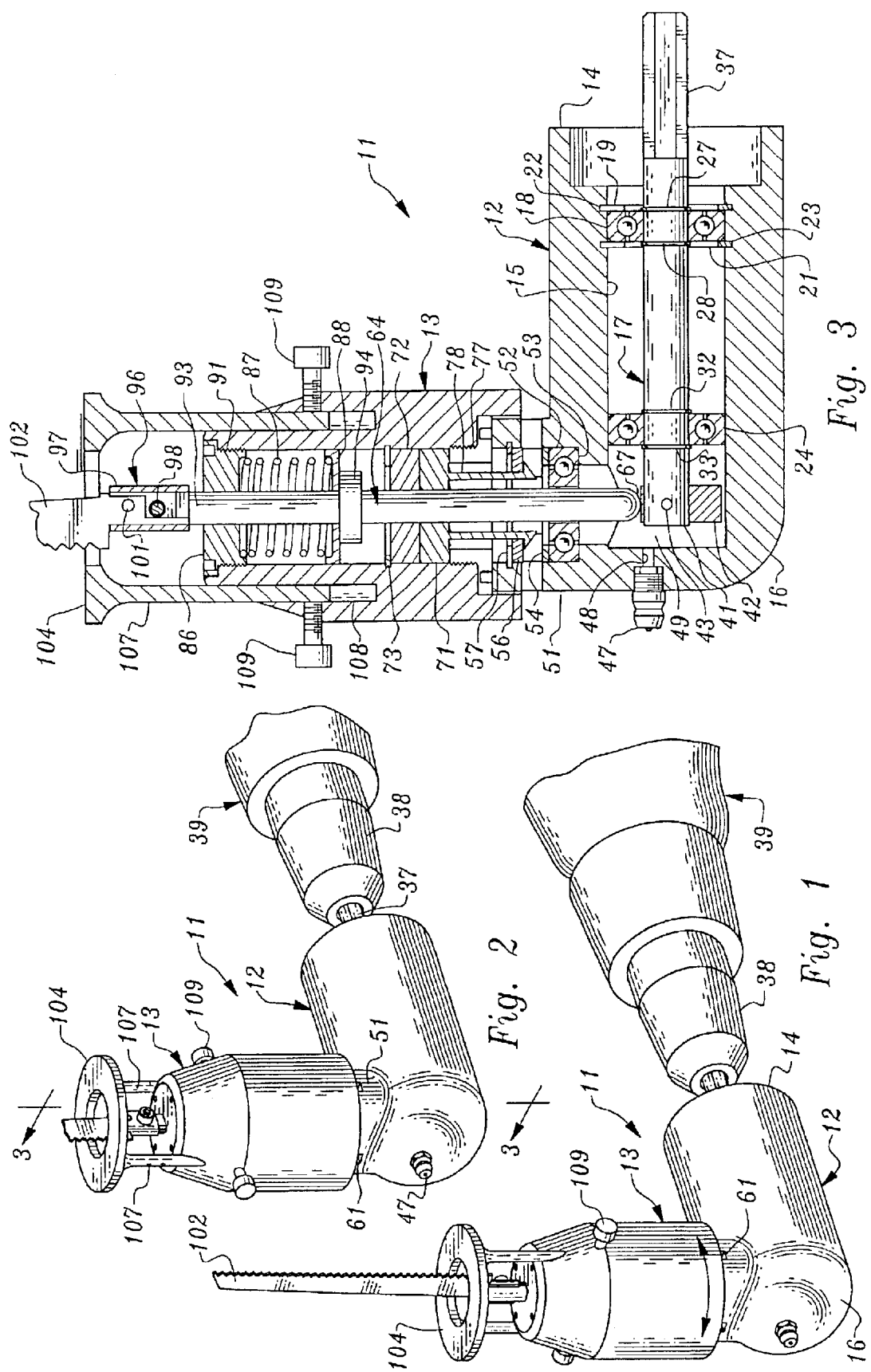

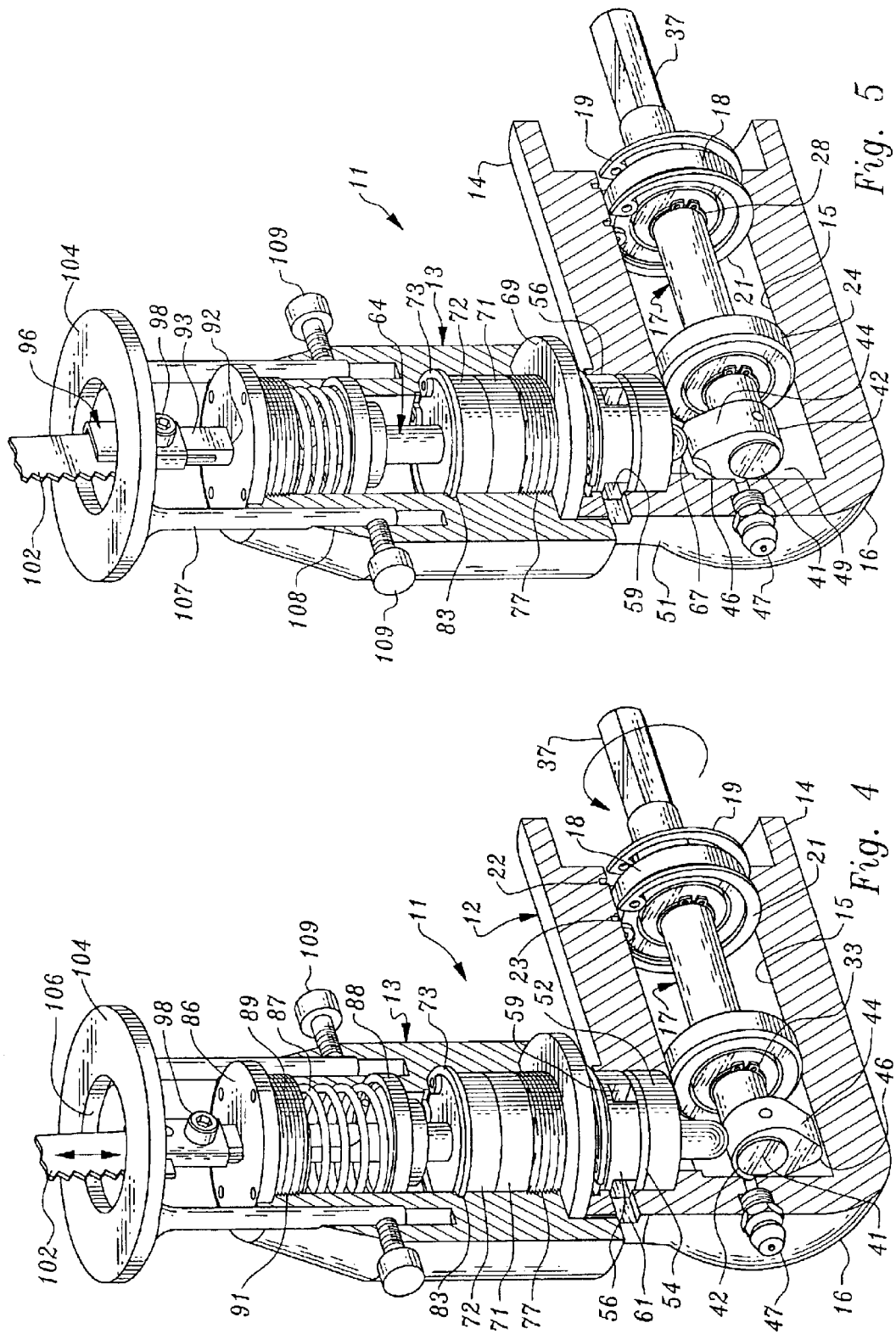

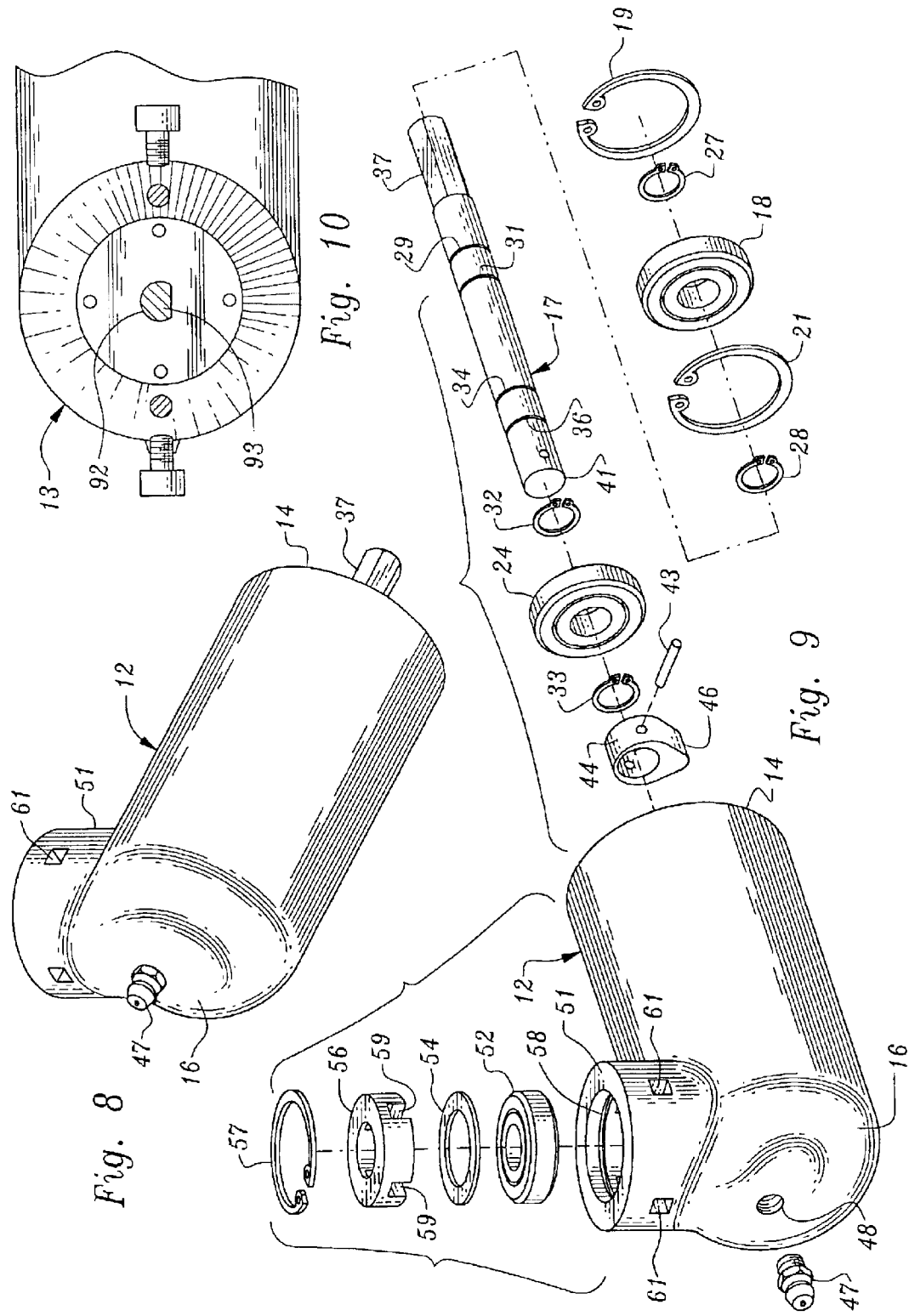

RIGHT-ANGLE ACCESSORY SAW FOR USE WITH ELECTRIC DRILL

BACKGROUND OF THE INVENTION

1. Field of the Invention

The invention relates generally to accessories for expanding the uses and applications of hand-held electric drills. More specifically, the invention pertains to an accessory saw for connection to the chuck of an electric drill, which utilizes the rotary power of the drill to drive a reciprocating saw blade at right-angles to the axis of the drill.

2. Description of the Prior Art

The prior art teaches a variety of accessory saw constructions, adapted for coupling to the rotary output of an electric hand drill. For example, in U.S. Pat. No. 5,755,293, granted to Bourke, a drill/saw apparatus is disclosed. In the Bourke device, bevel gears driven by an electric drill rotate an eccentric peg, held captive in a slot in a blade drive arm. The reciprocating action of the blade drive arm actuates the saw blade accordingly. The hexagonal drive shaft which transfers power from the electric drill to the apparatus maybe inserted into the apparatus housing at a plurality of positions. A similar arrangement is shown in U.S. Pat. No. 5,566,768, also granted to Bourke, for a drill attachment using helical and worm gears.

U.S. Pat. No. 3,398,588, issued to Meier, shows a reciprocating hand tool attachment for hand drills. Meier's device employs a pair of pulleys, connected by a friction drive belt. One of the pulleys has an eccentric cam for providing the reciprocating drive for the saw blade support mechanism.

In Lee, et al., U.S. Pat. No. 2,822,005, a jig saw attachment is disclosed which attaches both to the rotary output shaft and to the body of an electric drill. A motion converting mechanism includes a crank shaft head and an eccentrically mounted crank pin. Right angle reciprocating drive for the jig saw blade is thereby provided.

A reciprocating attachment for hand drills is shown in U.S. Pat. No. 5,607,265, issued to Lane. The attachment comprises a housing containing a grooved shaft. The saw blade is attached to a holder, which in turn, is operably connected to a bearing within the groove. A drill retainer clamps both to the drill and to the housing, preventing the housing from rotating.

Dedicated electrically powered reciprocating saws also exist, such as the SAWZALL brand saw, manufactured by the Milwaukee Tool Company. Although exhibiting high performance for their intended use, such dedicated reciprocating saws act in a direction which is coincident with or parallel to the axis of the tool. This limits the saw's usefulness when use is attempted in confined areas. In addition, dedicated reciprocating saws are expensive, and relatively large and heavy to use.

However, in many applications, sawing must occur in tight quarters, such as in attics or in crawl spaces beneath a house. In these circumstances, the need exists for a compact, right-angle reciprocating saw, which can saw at an angle which is 90 degrees from the axis of the tool which the user is grasping.

The need further exists for an accessory saw, for use with an existing electric hand drill, which is inexpensive, light in weight, and quick to connect and disconnect from the electric drill.

The need also exists for a right-angle accessory saw which can be manually rotated about the axis of the main drive shaft of the electric drill into a plurality of selected cutting positions, while the electric drill remains in a fixed position, in the hands of the user.

The need further exists for a right-angle accessory saw having a saw head which can be manually rotated about its axis into a plurality of selected cutting positions, while the electric drill remains in a fixed position, in the hands of the user.

SUMMARY OF THE INVENTION

The right-angle accessory saw of the present invention includes a drive shaft housing having a proximate end and a distal end. An elongated drive shaft is mounted for rotation within the drive shaft housing. The drive shaft has a drill connection end, extending outside and past the proximate end, for insertion into the chuck of a electric hand drill. The other end of the drive shaft terminates in a cam end, with a rotary cam mounted thereon. The cam is located within the distal end of the drive shaft housing.

The accessory saw also includes a saw head, having an inner end and an outer end.

The inner end of the saw head is rotatably mounted to a port in the side of the distal end of the shaft housing. The axis of the saw head is transversely position with respect to the axis of the shaft housing, extending at a right angle therefrom.

A push rod is mounted for reciprocating translation within the saw head. The push rod includes a cam follower on an interior end, and a saw blade holder on an exterior end. The cam follower extends into the distal end of the drive shaft housing, where it maintains contact with a cam surface of the cam. The push rod is spring-biased inwardly toward the cam, thereby maintaining the cam follower in substantially continuous contact with the cam surface at all times.

A saw blade of choice is installed in the saw blade holder. A simple screw and compression plate mechanism is disclosed which allows the user to install, remove, and change saw blades for the particular application at hand.

BRIEF DESCRIPTION OF THE DRAWINGS

FIG. 1 is a left-front perspective view of the accessory saw, showing its interconnection with the chuck of an electric hand drill;

FIG. 2 is view as in FIG. 1, but with the saw head rotated 90 degrees;

FIG. 3 is a cross-sectional view, taken along the line 3—3, in FIG. 2;

FIG. 4 is a left-front, cross-sectional, perspective view of the accessory saw, showing the cam follower in a retracted postion;

FIG. 5 is a view as in FIG. 4, but showing the cam follower in an extended position;

FIG. 8 is a perspective view, taken from a low angle, showing the drive shaft housing and the connection end of the drive shaft;

FIG. 9 is an exploded perspective view of the drive shaft housing and its associated components; and, FIG. 10 is a top plan view of the outer end of the saw head, taken on the line 6—6 in FIG. 6.

DETAILED DESCRIPTION OF THE PREFERRED EMBODIMENT

Figures 6, 7:
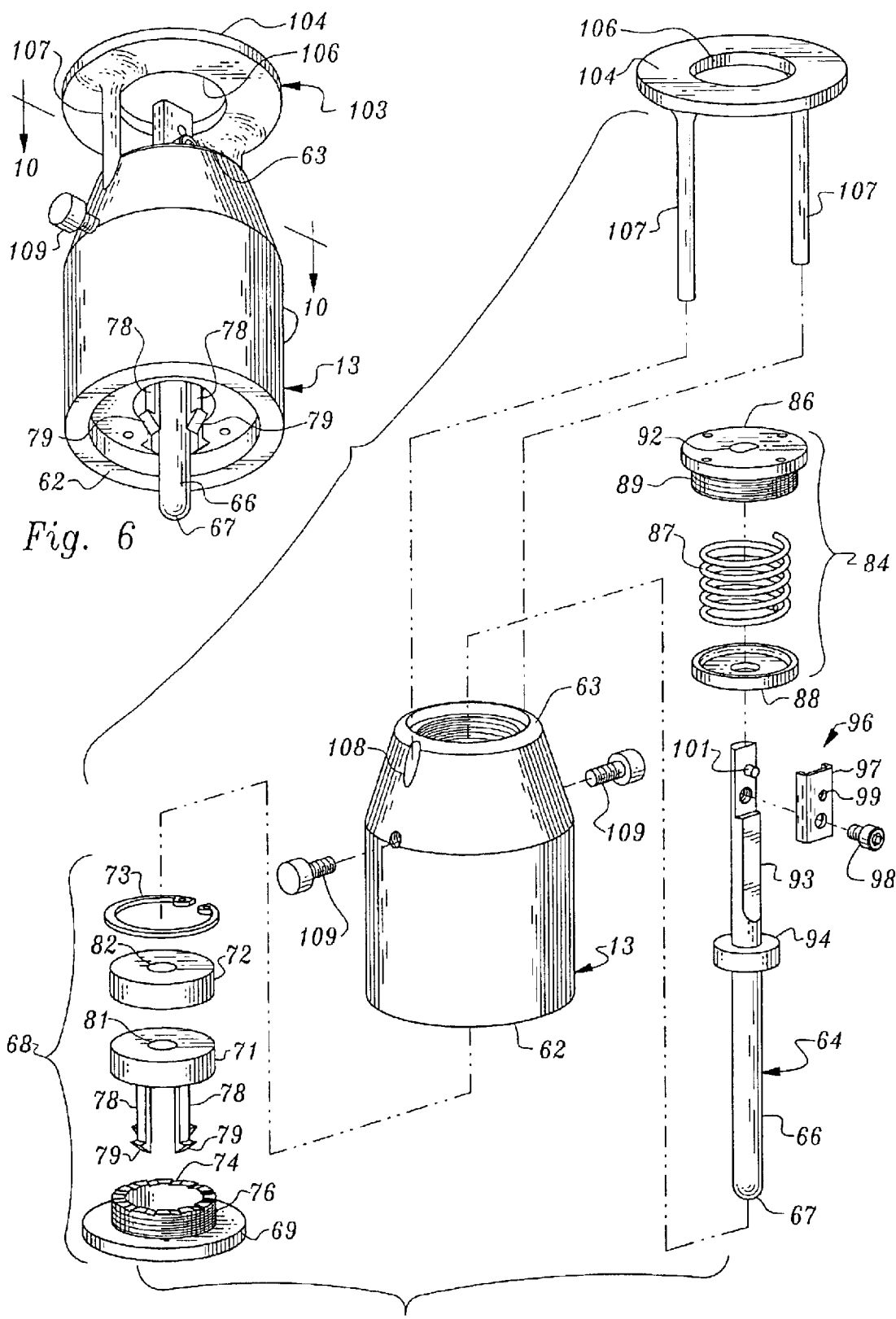
FIG. 6 is a perspective view, taken from a low angle, showing the saw head, the push rod, and the locking fingers.
FIG. 7 is an exploded perspective view of the saw head and its associated components.

Turning now to the drawings, and in particular to FIG. 1, the accessory saw 11 of the present invention includes as its major components, a drive shaft housing 12 and a saw head 13. Attention first will be given to the structural features of the drive shaft housing 12, with the saw head 13 to be described in detail thereafter.

As shown in FIG. 3, drive shaft housing 12 has a proximate end 14 and a distal end 16, with a shaft bore 15 extending therebetween. An elongated drive shaft, generally designated by the numeral 17, is mounted for rotation within the shaft bore 15. For that purpose, a first ball bearing 18 is provided in the proximate end 14. An outer spring clip 19 and an inner spring clip 21 are installed on either side of the outer, stationary portions of bearing 18. Clip 19 is secured within an annular recess 22, and clip 21 is secured in an annular recess 23.

A second ball bearing 24 is also located within the shaft bore 15, in the distal end 16 of the drive shaft housing 12. It should be noted that bearing 24 is not affixed in any way to shaft bore 15. However, both bearing 24 and bearing 18 are affixed to the drive shaft 17. As shown in FIG. 9, drive shaft 17 passes through each of the bores in the inner rotatable portions of ball bearings 18 and 24. Spring clips 27 and 28, installed respectively in grooves 29 and 31 in shaft 17, retain bearing 18 on drive shaft 17. Since spring clips 19 and 21 restrain the outer portion of ball bearing 18, drive shaft 17 is effectively restrained from axial movement along shaft bore 15. Spring clips 32 and 33, installed respectively in grooves 34 and 36 in shaft 17, retain bearing 24 on drive shaft 17. Bearing 24 is thereby restrained from axial movement along shaft 17.

Drive shaft 17 has a drill connection end 37 extending outside and past the proximate end 14 of the drive shaft housing. Connection end 37 is provided with a plurality of flats for positive locking engagement with the chuck 38 of a electric hand drill 39. The other end of the drive shaft terminates in a cam end 41, within the distal end 16 of the drive shaft housing 12. A cam 42 is mounted on cam end 41, secured by a transverse pin 43 passing through the cam and drive shaft 17. Cam 42 has a cam surface 44 and at least one cam lobe 46. Depending upon the repetition rate and the stroke length desired for the accessory saw 11, as well as the rotational speed of the electric hand drill 39, one of ordinary skill in the art can readily modify the configuration and the number of cam lobes used to effect the desired sawing action. A grease fitting 47 is provided in the distal end 16 of the drive shaft housing. A passageway 48, allows pumped grease to pass into a chamber 49, surrounding the cam 42.

A lateral port 51 is also provided on the distal end 16 of the housing 12. Lateral port 51 provides the connection interface between the housing 12 and the saw head 13. Making particular reference to FIG. 9, a ball bearing 52 is located within the port 51. The stationary, lower portion of the bearing rests upon a shelf 53. (See, FIG. 3). A washer 54 is positioned above the ball bearing on the stationary upper portion of the bearing. A locking collar 56 rests on the washer 54, and is secured in place by a snap ring 57. A groove 58 in the inner sidewall of the port accommodates the snap ring 57.

Four equally spaced cutouts 59 are provided in locking collar 56. The cutouts extend from the outside periphery of the collar to its interior bore. The locking collar is rotationally positioned in the port so that the cutouts 59 are aligned with corresponding access holes 61, extending through the sidewall of the port 51. Having explained the structural features of the drive shaft housing 12, we can now turn to specific aspects of the saw head 13.

The saw head 13 has an inner end 62 and an outer end 63. A push rod 64 is mounted for reciprocating translation within the saw head. Push rod 64 has an interior end 66 provided with a cam follower 67. Interior end 66 extends past inner end 62, through port 51, and into the distal end 16 of the drive shaft housing. Cam follower 67 is maintained in substantially continuous contact with cam surface 44, by means of an inwardly directed spring bias mechanism, described below.

An inner head assembly 68 comprises an inner cap 69, a locking finger holder 71, a guide bushing 72, and a spring clip 73. Inner cap 69 includes a bore 74 and outer threads 76. The inner end 62 of the saw head includes inner threads 77 which are threadably engaged by the outer threads 76 of the cap 69. The holder 71 includes four locking fingers 78, depending from its lower side. Each of the locking fingers 78 includes a barb 79 at its lower end. Locking fingers 78 are preferably made from spring steel, or a like material, for strength and resiliency. Holder 71 also includes an aperture 81, for passage of the interior end 66 of the push rod 64. The guide bushing 72, immediately above holder 71, is provided with an aperture 82 also to accommodate the translation of push rod 64. Lastly, spring clip 73 nests within a groove 83, so as to secure the inner head assembly together within inner end 62.

When saw head 13 is assembled with drive shaft housing 12, the locking fingers 78 are passed through the locking collar 56, until each of the barbs 79 engages a respective cutout 59. The outward spring action of the fingers 78 coupled with the configuration of the barbs 79, ensures a positive locking engagement between the locking fingers and the locking collar. When the inner end of saw head 13 and the lateral port 51 of drive shaft housing 12 are secured together in this fashion, axial tolerances between the parts are such that the head 13 can still be rotated about its axis with respect to the transverse axis of drive shaft housing 12. In the event that the saw head 13 ever needs to be removed from the drive shaft housing 12, a special tool (not shown) includes four pins which concurrently extend inwardly through cutouts 59, to urge the barbs out of the cutouts. Then, the saw head is free to be withdrawn from the housing 12.

The saw head also includes an outer head assembly 84, including an outer cap 86, a spring 87, and a spring cup 88. Outer cap 86 has outer threads 89 which threadably engage inner threads 91 of the outer end 63 of the saw head 13. Outer cap 86 also includes a D-shaped aperture 92, for passage of an exterior end 93 of push rod 64. (See, FIG. 10). The non-circular configurations of the aperture 92 and the exterior end 93 allow translation of rod 64 but prohibit any rotation thereof, unless the entire saw head itself is rotated. A stationary collar 94 is provided on push rod 64, at an intermediate location along its length. Collar 94 abuts the lower side of cup 88, and spring 87 is interposed between the upper side of cup 88 and the lower side of outer cap 86. The respective positions of collar 94 and the outer head assembly 84 are such that an inwardly directed spring bias is applied to push rod 64 at all times. Thus, irrespective of the whether push rod 64 is at an extreme retracted position (FIG. 4) or an extreme extended position (FIG. 5), the spring bias forces are effective to maintain cam follower 67 in substantially continuous contact with cam surface 44.

Push rod 64 also includes a saw blade holder 96 on its exterior end 93. Saw blade holder comprises a compression plate 97, a hex screw 98, a registration aperture 99, and a registration pin 101. Registration aperture 99 and registration pin 101 are laterally offset in the conventional manner, so a saw blade 102 can be installed in the saw blade holder 96 in only one proper way.

A depth guide assembly 103, is optionally installed on the outer end 63 of the saw head. Assembly 103 comprises a circular plate 104, having a circular cutout 106 therein to accommodate saw blade 102. A pair of support rods 107 depends from the underside of plate 104, slidably extending into respective bores 108 within saw head 13. A pair of threaded compression screws 109, is finger-tightened against rods 107, to lock depth guide assembly in the desired location with respect to the outer end 63. The depth of the cutting action of saw blade 102 is thereby determined.

In operation, the drill connection end 37 of the drive shaft 17 is inserted into the chuck 38 of an electric hand drill 39. After the chuck is tightened securely, the user rotates the body of the accessory saw 11 and the saw head 13 into the desired positions. While grasping the saw head 13, the user actuates the electric drill. The rotary action imparted to the drive shaft 17 is translated into reciprocating action by the cam 42 acting in conjunction with the cam follower 67. The reciprocating action is transmitted by the push rod 64 to the saw blade 102, thereby providing the desired cutting action at right angles to the drive axis of the electric drill.

What is claimed is:

1. A right-angle accessory saw for use with an electric drill, comprising:
   a. a drive shaft housing having a proximate end and a distal end and a longitudinal axis extending therebetween;
   b. an elongated drive shaft mounted for rotation within said drive shaft housing, said drive shaft having a drill connection end extending outwardly from said proximate end, and a cam end with a cam mounted thereon, said cam end being located within said distal end and said cam having a cam surface with at least one cam lobe extending transversely with respect to said axis of said housing;
   c. a saw head having an inner end and an outer end, said inner end being mounted to and extending from said distal end of said drive shaft housing, said saw head having an axis oriented at a right angle with respect to said longitudinal axis of said housing;
   d. a push rod mounted for reciprocating translation within said saw head, said push rod including a cam follower on an interior end and a saw blade holder on an exterior end, said cam follower extending into said distal end of said drive shaft housing into contact with said cam surface of said cam, said push rod being spring-biased inwardly toward said cam, thereby maintaining said cam follower in substantially continuous contact with said cam surface.

2. An accessory saw as in claim 1 including bearing means within said drive shaft housing, for maintaining said drive shaft in transverse and longitudinal axial alignment for rotation about said longitudinal axis.

3. An accessory saw as in claim 1 including a first drive shaft bearing within said proximate end of said drive shaft housing, and a second drive shaft bearing within said distal end of said drive shaft housing.

4. A accessory saw as in claim 1 including a saw blade mounted within said saw blade holder.

5. An accessory saw as in claim 1 in which said saw blade holder comprises a compression plate and a screw mounted to said exterior end, and including a saw blade having a shank portion between said compression plate and said exterior end.

6. An accessory saw as in claim 1 in which said saw head is rotatably attached to said drive shaft housing.

7. An accessory saw as in claim 1 further including a guide plate maintained at a predetermined distance from said outer end of said saw head.

8. An accessory saw as in claim 7 which said guide plate is supported by a pair of rods extending between said guide plate and said saw head.

9. An accessory as in claim 1 including an outer bushing within said outer end of said saw head and a inner bushing within said inner end of said head, and in which said push rod passes through said outer bushing and said inner bushing and includes a spring cup therebetween, further including a spring between an upper side of said spring cup and said outer bushing, thereby biasing said push rod inwardly toward said cam surface.

10. A right-angle accessory saw for use with an electric drill, comprising:
    a. a drive shaft housing having a proximate end and a distal end and a longitudinal axis extending therebetween;
    b. an elongated drive shaft, said drive shaft having a drill connection end extending outwardly from said proximate end, and a cam end with a cam mounted thereon, said cam end being located within said distal end and said cam having a cam surface with at least one cam lobe extending transversely with respect to said longitudinal axis of said housing;
    c. means for rotatably mounting said drive shaft within said drive shaft housing, restraining said drive shaft from both lateral movement and axial movement;
    d. a saw head having an inner end and an outer end, said inner end being rotatably mounted to and extending from a lateral port in said distal end of said drive shaft housing, said saw head having an axis oriented at a right-angle with respect to said longitudinal axis of said housing;
    e. a push rod within said saw head, said push rod including a cam follower on an interior end and a saw blade holder on an exterior end, said cam follower extending into said distal end of said drive shaft housing into contact with said cam surface of said cam, said push rod being spring-biased inwardly toward said cam, thereby maintaining said cam follower in substantially continuous contact with said cam surface; and,
    f. means for mounting said push rod for reciprocating translation within said saw head.

11. An accessory saw claim 10 which said means for rotatably mounting said drive shaft within said housing comprises a first bearing adjacent said proximate end and a second bearing adjacent said distal end, said first and second bearings having stationary portions connected to said housing.

12. An accessory saw as in claim 10 in which said means for mounting said push rod for reciprocating translation within said saw head includes a push rod bearing in said port and an upper bushing within said outer end of said saw head.

13. An accessory saw as in claim 12 further including a locking finger receptacle rotatably mounted in said port, said finger receptacle including a plurality of finger apertures therein, and a locking finger collar in said inner end of said saw head, said finger collar including a plurality of fingers extending therefrom and in locking engagement with respective said apertures.

14. A accessory saw as in claim 10 including a saw blade mounted within said saw blade holder.

15. An accessory saw as in claim 10 in which said saw blade holder comprises a compression plate and a screw mounted to said exterior end, and including a saw blade having a shank portion between said compression plate and said exterior end.

16. An accessory saw as in claim 10 further including a guide plate maintained at a predetermined distance from said outer end of said saw head.

17. An accessory saw as in claim 16 which said guide plate is supported by a pair of rods extending between said guide plate and said saw head.

18. An accessory saw as in claim 17 which said rods slidably extend into respective bores in said saw head, and further including compression screws in said saw head which may be tightened against said rods, establishing a desired location for said guide plate.

19. A right-angle accessory saw for use with an electric drill, comprising:
   a. a drive shall housing having a proximate end and a distal end;
   b. an elongated drive shaft mounted for rotation within said drive shaft housing, said drive shaft having a drill connection end extending outwardly from said proximate end, and a cam end with a cam mounted thereon, said cam end being located within said distal end;
   c. a saw head having an inner end with an inner bushing therein and an outer end with an outer bushing therein, said inner end being mounted to and extending transversely from said distal end of said drive shaft housing;
   d. a push rod mounted for reciprocating translation within said saw head, said push rod including a cam follower on an interior end and a saw blade holder on an exterior end, said cam follower extending into said distal end of said drive shaft housing into contact with a cam surface of said cam, and in which said push rod further passes through said outer bushing and said inner bushing and includes a spring cup therebetween;
   e. a spring between an upper side of said spring cup and said and said outer bushing, thereby biasing said push rod inwardly toward the cam surface and said cam follower is maintained in substantially continuous contact with said cam surface.

20. A right-angle accessory saw for use with an electric drill, comprising:
   a. a drive shaft housing having a proximate end and a distal end, said distal end including a lateral port having a locking finger receptacle rotatably mounted therein, said locking finger receptacle including a plurality of finger apertures;
   b. an elongated drive shaft, said drive shaft having a drill connection end extending outwardly from said proximate end, and a cam end with a cam mounted thereon, located within said distal end;
   c. means for rotatably mounting said drive shaft within said drive shaft housing, restraining said drive shaft from both lateral movement and axial movement;
   d. a saw head having an inner end and an outer end, said inner end including a locking finger collar provided with a plurality of fingers extending therefrom and in locking engagement with respective said finger apertures, whereby said saw head is rotatably mounted to and extending transversely from said lateral port;
   e. a push rod within said saw head, said push rod including a cam follower on an interior end and a saw blade holder on an exterior end, said cam follower extending into said distal end of said drive shaft housing into contact with a cam surface of said cam, said push rod being spring-biased inwardly toward said cam, thereby maintaining said cam follower in substantially continuous contact with said cam surface; and,
   f. means for mounting said push rod for reciprocating translation within said saw head.

* * * * *